US006976056B1

(12) United States Patent
Kumar

(10) Patent No.: US 6,976,056 B1
(45) Date of Patent: Dec. 13, 2005

(54) APPARATUS AND METHOD FOR COMPANY REPRESENTATIVES TO MONITOR AND ESTABLISH LIVE CONTACT WITH VISITORS TO THEIR WEBSITE

(75) Inventor: Manu Kumar, Pittsburgh, PA (US)

(73) Assignee: E.Piphany, Inc., San Mateo, CA (US)

( * ) Notice: Subject to any disclaimer, the term of this patent is extended or adjusted under 35 U.S.C. 154(b) by 728 days.

(21) Appl. No.: 09/593,978

(22) Filed: Jun. 13, 2000

Related U.S. Application Data

(60) Provisional application No. 60/139,429, filed on Jun. 14, 1999.

(51) Int. Cl.[7] .................. G06F 15/16; G06F 17/60; G06F 15/173
(52) U.S. Cl. .................. 709/206; 705/26; 705/27; 709/224
(58) Field of Search .................. 709/206, 217, 709/224, 204; 345/854, 629, 339; 705/27, 705/26

(56) References Cited

U.S. PATENT DOCUMENTS

| | | | |
|---|---|---|---|
| 5,768,528 A | | 6/1998 | Stumm |
| 5,877,759 A | * | 3/1999 | Bauer .................. 719/317 |
| 5,944,791 A | | 8/1999 | Scherpbier |
| 6,032,129 A | * | 2/2000 | Greef et al. .................. 705/27 |
| 6,091,417 A | * | 7/2000 | Lefkowitz .................. 345/854 |
| 6,175,842 B1 | * | 1/2001 | Kirk et al. .................. 715/513 |
| 6,256,043 B1 | * | 7/2001 | Aho et al. .................. 345/629 |
| 6,272,531 B1 | * | 8/2001 | Shrader .................. 709/206 |
| 2001/0054064 A1 | * | 12/2001 | Kannan .................. 709/203 |

FOREIGN PATENT DOCUMENTS

| | | | | |
|---|---|---|---|---|
| EP | 926614 A2 | * | 6/1999 | .......... G06F 17/60 |
| WO | WO 9901826 A2 | * | 1/1999 | .......... G06F 17/00 |

* cited by examiner

Primary Examiner—David Wiley
Assistant Examiner—Michael Delgado
(74) Attorney, Agent, or Firm—Bingham McCutchen LLP; Fabio E. Marino; Saina S. Shamilov

(57) ABSTRACT

A system for allowing company representatives or web site operators to monitor and track activity of visitors to their web site and proactively establish live contact with the visitor using text messaging. A customer service representative of a website operator can instantly send a message to a visitor in order to help them obtain the most relevant information desired, and to directly answer any questions the visitor may have. A radar screen provides information to the website operator of how people are accessing their website by providing on one screen a visual comparison of the different locations or pages within the website where the visitors are browsing. The radar screen can be divided into sectors representative of each of these locations, and the number of visitors to each one is indicated.

11 Claims, 9 Drawing Sheets

APPARATUS AND METHOD FOR COMPANY REPRESENTATIVES TO MONITOR AND ESTABLISH LIVE CONTACT WITH VISITORS TO THEIR WEBSITE

BACKGROUND OF THE INVENTION

This application is related to provisional patent application Ser. No. 60/139,429 filed on Jun. 14, 1999.

1. Field of the Invention

The invention relates to a system for establishing a live contact between visitors to a website and a representative of the company or organization or individual whose website is being visited. The invention combines the Web with instant messaging to allow website operators to monitor in real-time how many people are visiting sections of their website, from where and for how long and to proactively approach the visitor with an instant message, thereby engaging the visitor in a dialog with the company representative.

2. Description of the Prior Art

The World Wide Web has transformed the way in which businesses operate today. The majority of companies in the world today are either already on the Web or moving towards it. Studies have shown that the majority of consumers will first turn to the Web as a source of information before they make a buying decision.

However, if the Web has done one thing, it has made business more competitive. Buyers have information available at their fingertips and the competition is literally "one click" away. Though this has been an immense boon to buyers, it makes competing in the Internet marketplace more difficult. In a way, the Web has empowered the "browsers" to get more information and have the power of gathering the information.

On the other hand, companies, organizations, and individuals who establish a website for personal or for business use, are always trying to find the answer to the questions: Who is visiting my website? What information are they viewing? Are they finding the information they need? How do I contact the prospective customers on my website?

Current approaches to answering the above questions include lengthy and complicated analysis of web site log files and statistical analyses to predict the demographics of the visitors to a web site. For high traffic web sites this results in analyzing several gigabytes of data to produce a report which is marred with statistics and graphs which, though informative to some level, lack the ability to provide a good feel for the pulse of the website.

At the same time, the Internet has created a need for real-time analysis and action. Information needs to be available faster and decisions made faster based on the availability of this information. Though there have been several companies offering real-time log-analysis, the resulting information is still vague and does not allow the company to literally reach out and communicate with their customers or visitors to their web site.

The rationale behind this invention is to treat visitors to a website with the same amount of respect and hospitality as if they had literally walked in to your office or home, rather than simply spending millions of dollars to just put out information on the web for people to find by themselves.

The invention described herewith provides the website operators with the ability to answer the questions mentioned above and more, creating a unique approach to operating a website and truly getting their finger on what is happening on the web site at any instant in time.

It is therefore an object of the present invention to empower website operators to monitor visitors to their web site and to empower them (website operators) to proactively approach visitors on their website to offer assistance or solicit sales.

SUMMARY OF THE INVENTION

The above and other objects are attained by the present invention, according to which, briefly stated, an apparatus for company representatives to monitor and establish live contact with visitors to their website is provided. An apparatus for monitoring website activity comprises means for tracking a visit to a website by a visitor, along with means for identifying that visitor. The apparatus monitors the progress of the visitor to additional pages within the website, and includes means for initiating direct communication with the visitor according to the progress of the visitor within the website. Preferably, a "radar" screen is provided to track the number of visitors at particular pages within the website. In order to initiate direct contact with a visitor, means are provided for presenting a text box to the visitor, preferably within his or her browser, by a customer service representative. The text box further includes means for identifying the customer service representative to the visitor and an interactive dialog box for the exchange of information between the customer service representative and the visitor. The dialog between the customer service representative and the visitor is instantaneous and real-time as the visitor navigates through the website.

BRIEF DESCRIPTION OF THE DRAWINGS

There are shown in the drawings certain exemplary depictions of screen displays of the invention as presently preferred. It would be understood that the invention is not limited to the displays shown as examples, and such displays are capable of variations with the scope of the appended claims. In the drawings:

DETAILED DESCRIPTION OF THE PREFERRED EMBODIMENT

Figure 1:
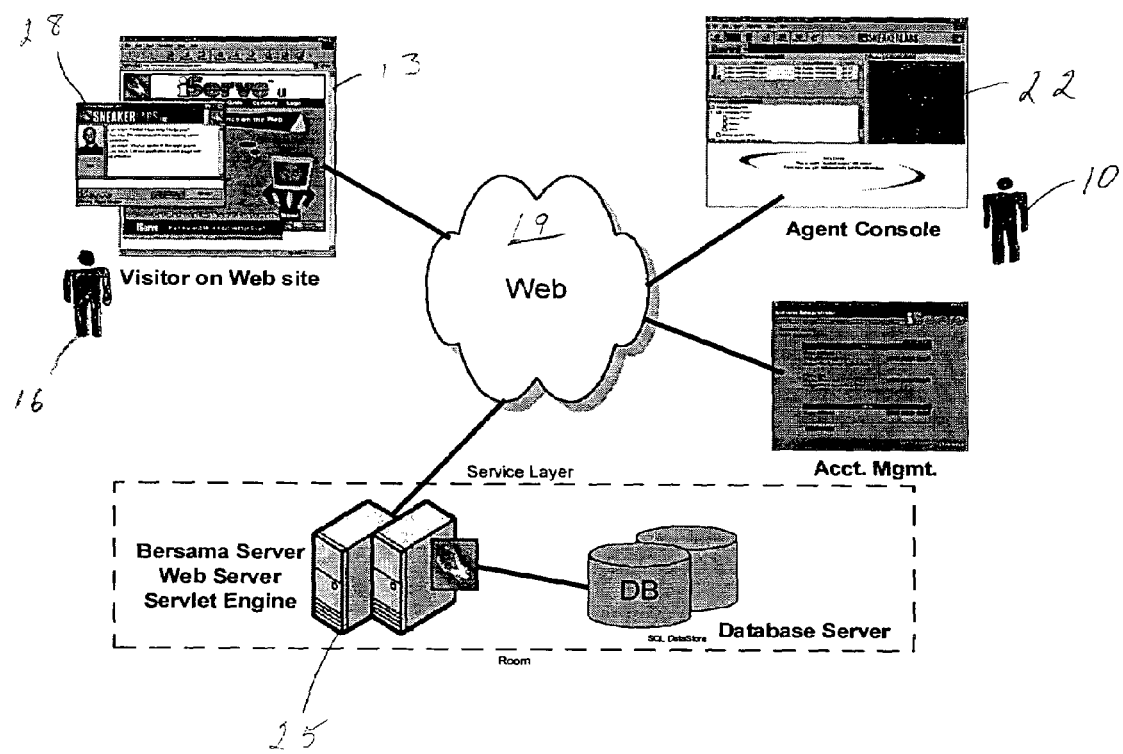
FIG. 1 is schematic diagram of the website visitor contact methodology of the present invention.

As shown generally in FIG. 1, the apparatus of the present invention works by embedding an "Agent" 10 in the web pages for the website 13 that wishes to incorporate the ability to monitor and approach visitors 16 to the site. The Agent is currently implemented as a Java-applet which is embedded into an HTML page by using the <APPLET>HTML tag. When a visitor arrives on a website through the web 19 and loads up any page which has been enabled with the Agent the visitor shows up on a Console 22 at the website operator's location.

At the time the Agent is loaded up along with the web page, the Agent initiates a Network connection back to a server 25 (currently the Bersama Collaboration Server) and announces that a visitor is currently looking at this page. This information is received by the Console (s) 22 which then updates its display to show that a visitor 16 is looking at the page.

The information received by the Console 22 is also used to construct a "Radar" screen view of the website (see FIGS. 4A and 4B), allowing the website operators to get a real-time overall view of the traffic on the website, partitioned into zones. A website operator or Customer Service Representative (CSR) 28 has the ability to see where the visitor 16 to their site 13 is coming from (IP address or domain), what page they are currently on and what time they arrived on the page. The CSR 28 may then pro-actively approach the visitor by clicking on the listing for a particular visitor.

Figure 6A:
FIG. 6, consisting of FIGS. 6A and 6B, show representations of a Dialog tab in which the CSR may communicate back and forth with the visitor and launch new web pages in the visitors browser.
Figure 6B:
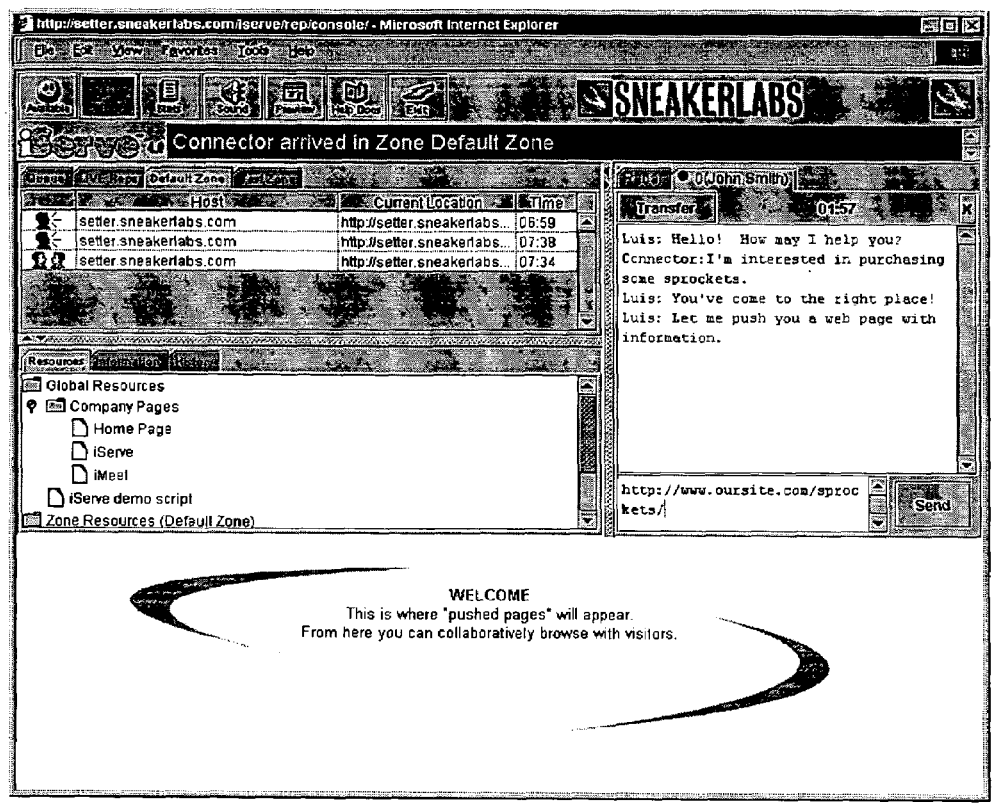

When the CSR 28 clicks on a visitor's listing, the Console 22 sends a message to the Agent 10 to activate the agent. The Agent then launches up a new window (See FIGS. 6A and 6B) on the visitors computer with the message from the CSR 28. In this way, the CSR 28 has the ability to instantly send a message to the visitor 16 on the website and thereby engage the visitor in an on-going dialogue.

Once engaged in a dialog, the CSR 28 and the visitor 16 can communicate with each other using text. The CSR 28 also has the ability to launch a new browser window and push relevant information to the visitor's web browser.

Figure 2:
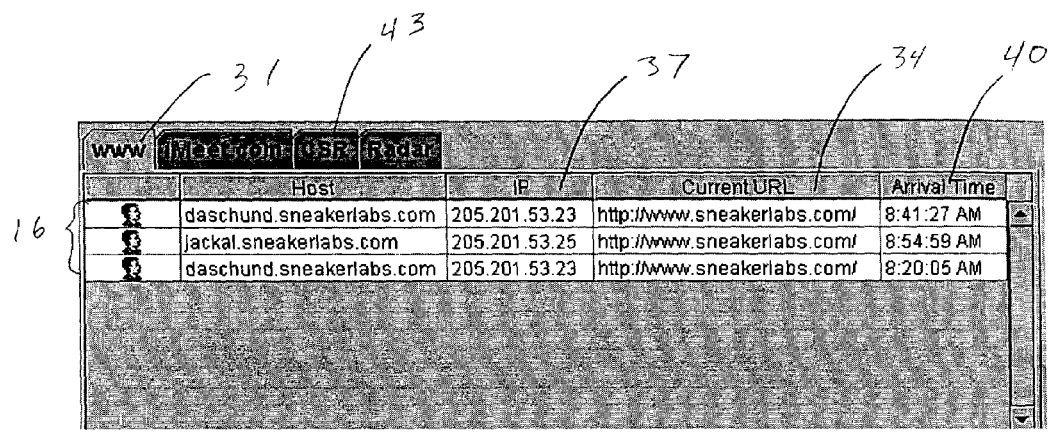
FIG. 2 is a preferred view of the Zone tab of the console which displays the visitors in a particular area (zone) of the website.
Figure 3:
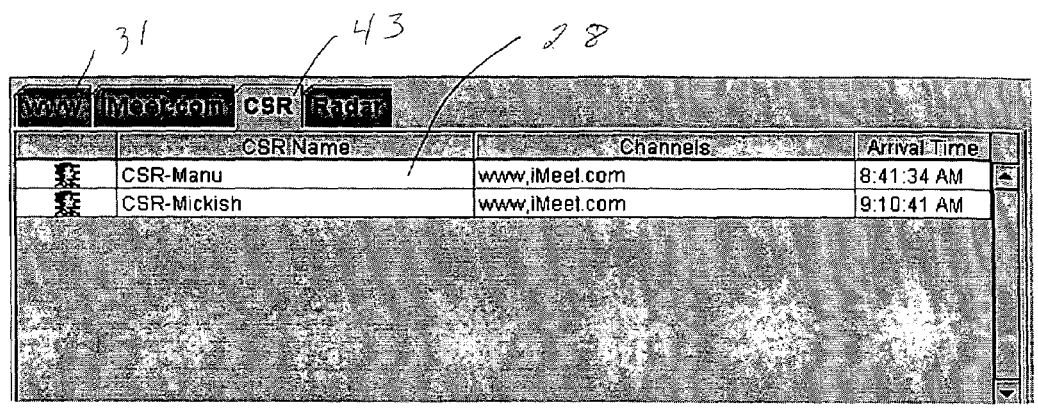
FIG. 3 is a preferred screen display for the CSR tab which shows all the Customer Service Representatives that are currently monitoring the various zones of the site.

Referring now to the remaining drawings in detail, FIG. 2 shows a preferred embodiment of the present invention in which a console 22 at the website operator's location can display information regarding the use of the website 13 by people on the Internet or World Wide Web 19. For example, in the Zone tab 31 of FIG. 2 those people or visitors 16 visiting a particular website 34, such as WWW.SneakerLabs.com, are listed therein. Also, the area where they are visiting from 37, labeled "IP," is also displayed. The last column indicates the time 40 that that particular person connected to the particular website 13. By clicking on the tab 43 listed as "CSR," the website operator can see what customer service representatives 28 are currently monitoring the site to provide assistance and information to those visiting the operator's website (FIG. 3).

Figure 5A:
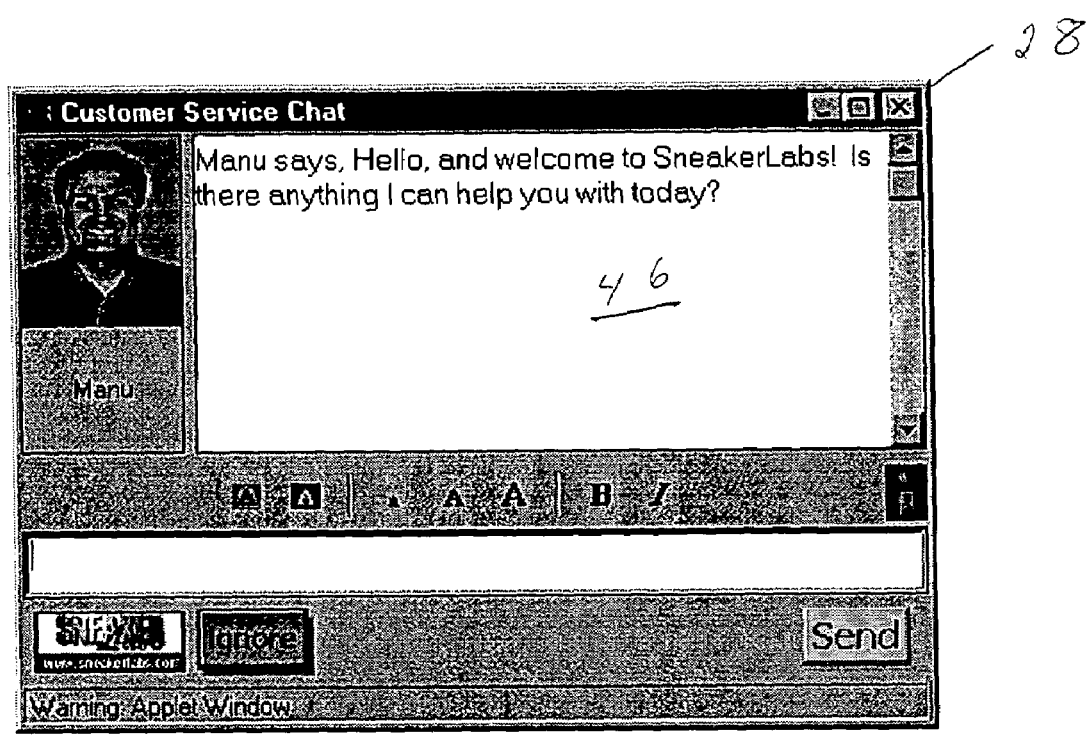
FIG. 5, consisting of FIGS. 5A and 5B, show alternate screen displays for the Message window that pops up on the visitors computer when the CSR initiates a discussion with the visitor.
Figure 5B:
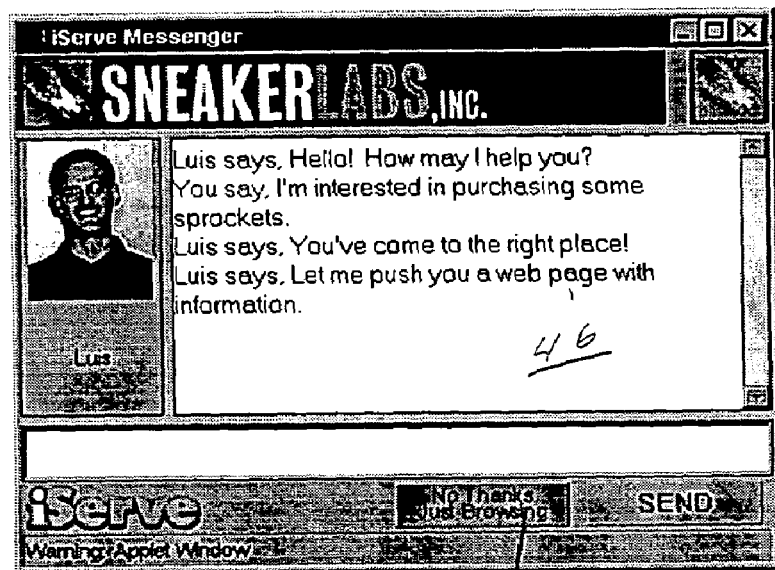
Figure 5B:
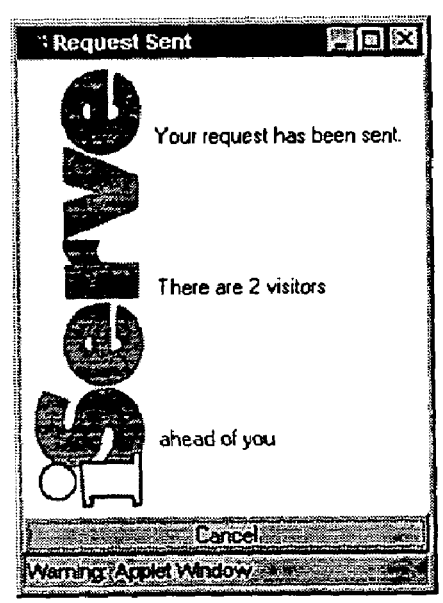

By monitoring visitors to the operator's website 13, the operator can provide direct assistance and more pertinent information to the visitor 16 of the website by the use of the present invention. For example, if it is noted that a visitor 16 to a particular website has been viewing the information on that page for several minutes the CSR 28 can "click" on the visitor's listing which causes a message to be sent to the visitor 16 by the agent 10 (FIG. 5). A text screen 46 can appear on the visitor's display monitor from one of the CSR's 28. The customer service representative can initiate a dialog with the website visitor 16 so as to provide more detailed information to the visitor on a direct one-on-one basis through these text messages.

Figure 4A:
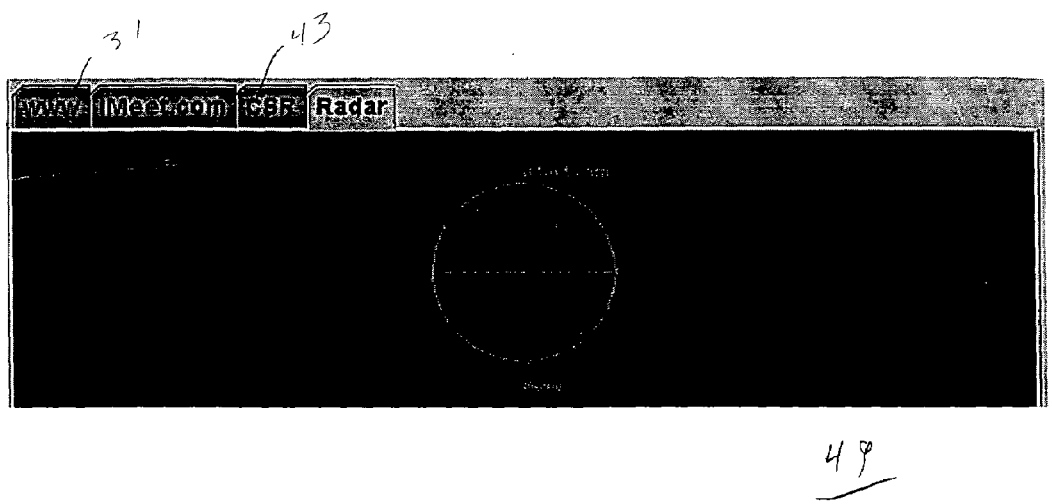
FIG. 4, consisting of FIGS. 4A and 4B, show alternate screen displays for the Radar screen view which shows the overall traffic distribution for the website(s) for the zones being monitored.
Figure 4B:
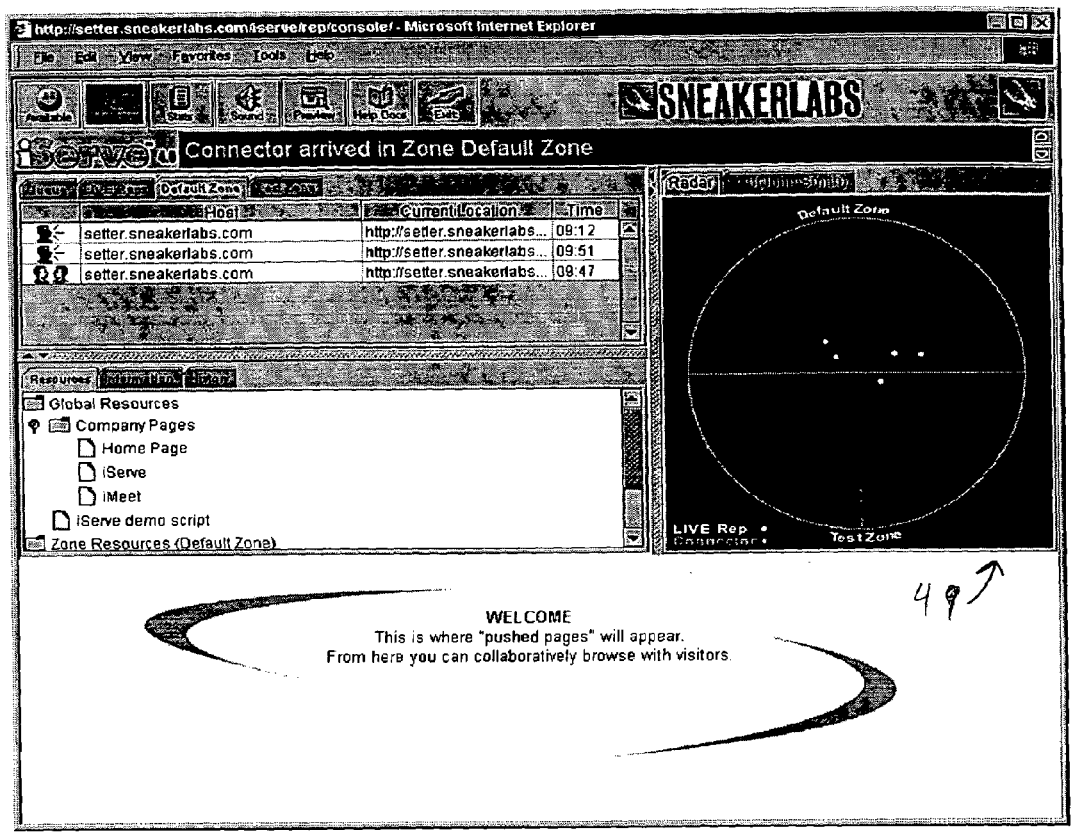

In addition to providing a listing of the visitors to the website (FIG. 2), the present invention also has a "radar" screen 49 to give an overall summary of the visitors to the website. Such a screen can be broken up into different sectors indicating the various levels or pages within a particular website operator's website (FIGS. 4A and 4B). Thus, the number of visitors to a different sector, for example, in the overall website can be relayed to the CSR's 28. It would be readily apparent that other such indicators may be used to denote relative activity within a particular website. For example, a bar graph mechanism, similar to the output for stereo a graphic equalizer, can be used to indicate movement within the site, such as the individual bar graphs moving up and down to indicate how many people may be visiting particular sectors or pages on the site.

By way of our illustration, such as for the on-line sale of merchandise to website visitors, an example of the use of the present invention will be described. It is not uncommon for visitors to "surf the web" in order to obtain information on products and services that they can then purchase through the Internet, or as means for obtaining relevant information to then initiate a transaction at a local retail outlet. For example, the purchaser of computer equipment can visit any website which an be operated either by distributors or manufacturers of such equipment in order to obtain the information needed to make the purchasing decisions. By way of example, if a person were interested in a certain computer equipment component, such as a printer, that person can visit a manufacturer's website in order to obtain the information.

However, it is not uncommon for such manufacturers to also offer other types of computer equipment, such as monitors, CPU's, fax machines, copiers, and other related equipment. Thus, when a person first visits such a website they can make a choice from a list of types of products, such as those listed above, from which to obtain more detailed information. At the operator's console 22 when a person first logs on to the company's website there would be a notification that that visitor 16 has accessed the first page, for example, of the computer equipment manufacturer's website. Once the visitor 16 makes a decision that it is a printer that they are particularly interested in and accesses that lower level page within the website, such as by clicking on the internal link, the visitor 16 can thus obtain information on printers. There may be various types of printers such as ink jet printers or laser printers that may be available, from which the website visitor must choose. The visitor 16 may either get information on all different models of printers that the manufacturer has or can make the choice as to these different types, as in the example given between ink jet and laser printers. Once the visitor gets down to a level where they are looking at individual models of a particular printer type, or at any time for example, the CSR 28 can initiate a dialog with the visitor 16 by sending a message asking the visitor if they need help in comparing the features of a particular group of printers, for example.

It should also be understood, however, that the CSR 28 can notify the visitor at any level once that visitor connects to the website so as to help direct the visitor to that location where they have their particular interest. By initiating the dialog, the CSR 28 can help the visitor make a more informed decision by helping the visitor eliminate having to go through a number of screens in order to get to the relevant information in which that visitor is interested. Moreover, the CSR 28 can answer any questions the visitor may have about any particular piece of information that is obtained on the website, such as which printers are compatible with other types of equipment that that person may already be utilizing. Thus, the website operator can proactively engage potential customers who are browsing their website, in order to more fully explain those products and services in which they may be interested, so as to facilitate either on-line or direct sales of those products and services to the website visitors. It is to be understood that the visitor may opt out of the dialog with the CSR 28. As shown in FIG. 5B for example, when the CSR 28 initiates contact, the visitor 16 can decline the invitation by clicking a button 52 which states "No thanks; just browsing". The visitor 16 can re-establish contact later, however, by typing in a message to the CSR 28, such as by asking a specific question.

Preferably, the dialog between the CSR 28 and the visitor 16 is saved in a database as a contact transcript. This database can be analyzed to determine the types of questions the visitors are asking, as well as ensuing that the information provided to the visitor 16 by the CSR 28 was accurate and helpful. Additionally, there may be occasions where the CSR 28 that initially contacts the visitor 16 is not the most knowledgeable concerning the information being sought by the visitor. The CSR 28 can then transfer the visitor to another CSR 28 having more specialized knowledge, and the second CSR 28 would be given the transcript of the dialog up to that point. As a feature of the present invention, the visitor 16 can be given the opportunity to receive a copy of the transcript, either by printing it from the screen or by receiving an email from the CSR 28. This way, the visitor 16 can review the information he or she has received at another time and possibly re-enter the website to make his or her final purchase decision, or be contacted by a CSR 28 to ask additional questions.

The information regarding visitors on various pages of the website is captured and recorded in the form of a "clickstream". The clickstream records the information regarding the IP address of the visitors, what page the visitor 16 was accessing, when the visitor arrived on the page, as well as when did the visitor leave from this page. This clickstream generates valuable information which in some ways is similar to the information produced by the web-servers logs, except the clickstream may include additional information over and above what a webservers log files contains (leave times are one such example).

Based on the information being captured in real-time by the system, intelligent rules can be configured to detect certain browsing patterns which may be of interest to website operators. For example, a users going back and forth between the same pages multiple times, may indicate that the user is confused and could use additional help; a user who has been idle on an order form page may similarly have some problem due to which he/she has not completed the order and may potentially abandon his or her shopping cart resulting in a lost sale for the website. As another feature of the present invention, preferably includes a typing indicator to provide feedback when a visitor 16 is typing information into an appropriate field within the website. This can be an indication, for example, that the visitor is actively seeking information rather than merely browsing through the site. In this way, a CSR 28 is notified that a visitor 16 is more than just a casual browser and would appreciate receiving direct contact to help him or her obtain the specific information the visitor 16 needs.

Based on the browsing patterns of the visitor being analyzed in real-time, the rules may trigger an alert to a Customer Service Representative, advising the representative that this visitor 16 is a good prospect to approach, or this information may be used to prioritize customers in the view being seen by the support representatives.

The apparatus described in this invention may be implemented in more than just the sample embodiment described above. An alternative approach is to embed Javascript code in the website. When the visitor arrives on the page, the Javascript embedded in the page can make a request to the web server notifying it of the visitor's arrival. Thereafter, the communication between the visitors browser and the server may be accomplished by having the JavaScript poll the server at periodic intervals for any updated information. When the user requests assistance or a customer service representative approaches a user, the server can then update the client's browser to launch a new window in order to initiate the chat dialog between the visitor 16 and the customer service representative.

Therefore, it is possible to achieve the same effect as by the detailed description above using different technologies, while the specific implementation for a particular technology would be readily apparent to one skilled in the art knowing the principals of the invention as described herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims, and any and all embodiments thereof.

What is claimed is:

1. An article of manufacture for monitoring website activity and tracking a visit to a website by each visitor from a plurality of visitors, the article of manufacture comprising:
 a computer-readable medium having stored therein a computer program executable by a processor,
 the computer program comprising instructions for:
 monitoring viewing by each visitor of pages within the website;
 initiating direct communication with at least one visitor according to the viewing progress of the visitor of the at least one visitor of pages within the website; and
 displaying a radar screen that provides on one screen an indication of a number of visitors accessing each of the pages within the website and a visual comparison of different locations within the website where the visitors are browsing.

2. The article of manufacture as recited in claim 1 wherein the computer program further comprises instructions for initiating direct communication with the visitor via a text box which is presented to the visitor by a customer service representative, the text box includes an identification of the customer service representative to the visitor and includes an interactive dialog box for the exchange of information between the customer service representative and the visitor.

3. A method of providing customer service to a website visitor, the method comprising:
 identifying to a website customer service representative that a visitor has accessed the website;
 identifying the visitor to the customer service representative;
 monitoring viewing progress of the visitor of pages in the website;
 connecting the customer service representative with the visitor; and
 providing a dialog box from the customer service representative to the visitor such that instantaneous real-time communication is initiated between the customer service representative and the visitor based on the monitored viewing progress of the visitor of the pages in the web site; and directing the visitor to a page that is of interest to the visitor; and displaying a radar screen to the customer service representative that provides on one screen an indication of a number of visitors accessing each of the pages within the website and a visual comparison of different locations within the website where the visitors are browsing.

4. The method of claim 3, further comprising:

detecting a browsing pattern from the monitored progress.

5. The method of claim 4, wherein detecting the browsing pattern comprises indicating that the visitor is purchasing an item and providing the dialog box comprises helping the visitor purchase the item.

6. The method of claim 4, wherein detecting the browsing pattern comprises indicating that the visitor is actively seeking information and providing the dialog box comprises providing desired information to the visitor.

7. The article of manufacture of claim 1, wherein the computer program further comprises computer instructions for detecting a browsing pattern from the monitored progress.

8. The article of manufacture of claim 7, wherein said computer program comprise instructions for indicating that the visitor is purchasing an item and helping the visitor purchase the item.

9. The article of manufacture of claim 7, wherein said computer program comprise instructions for indicating that the visitor is actively seeking information and for providing desired information to the visitor.

10. The article of manufacture of claim 7, wherein said computer program comprises instructions for indicating that the visitor is navigating through pages of the website and directing the visitor to a page that is of interest to the visitor.

11. The article of manufacture of claim 1, wherein said computer program comprises instructions for sending a message to the visitor based on the monitored progress.

* * * * *